G. H. Mellen,
Canteen Stopper.
Nº 33,443.  Patented Oct. 8, 1861.
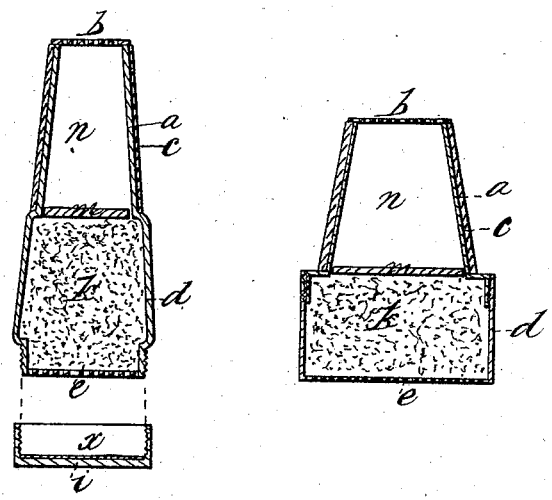
Witnesses:
Nelson W. Steele
Jeremy W. Bliss
Inventor:
George H. Mellen

UNITED STATES PATENT OFFICE.

GEORGE H. MELLEN, OF HARTFORD, CONNECTICUT.

IMPROVEMENT IN FILTERING-STOPPERS.

Specification forming part of Letters Patent No. 33,443, dated October 8, 1861.

*To all whom it may concern:*

Be it known that I, GEORGE H. MELLEN, of Hartford, county of Hartford, and State of Connecticut, have invented certain new and useful Improvements in Filters and Stoppers for Canteens or other Vessels; and I do hereby declare that the same is described and represented in the following specification and drawing.

To enable others skilled in the art to make and use the same I will proceed to describe its construction and operation, referring to the drawing, in which the same letters indicate like parts in each of the figures.

The nature of this improvement will be fully understood from the claim and drawing.

Its object is to combine in one article a filter and stopper to be used in a canteen, bottle, or other vessel, that the soldier or other person who requires the use of a filter in connection with a portable vessel may always have one at hand in this improvement.

In the accompanying drawing is shown a stopper and filter combined as of my invention.

$a\ a$ is a metallic stopper, made tapering or otherwise, as desirable.

$b$ is a perforated plate secured on the inner end and made slightly larger than the end of the stopper.

$c$ is an elastic sheath secured on the outside of the stopper $a$ for the purpose of adapting itself to the irregular shape of the nozzle in which it is used.

$d$ is an outer and enlarged section of the stopper, which I propose sometimes to make with a screw, for the greater convenience of changing the filtering materials.

$e$ is a perforated plate secured to the outer end of the stopper.

$i$ is a cap designed to be screwed on the outer end of the stopper, and has an elastic substance $x$, fitted therein for a packing, so that when the cap is screwed down the stopper will be water or air tight.

$k$ is that portion of the stopper filled with granulated charcoal.

$m$ is one or more thicknesses of felt or gauze.

$n$ is a sponge or an apartment in which a spongy material is placed. Now, when the vessel is filled with water and closed with this stopper, the water may be drunk freely therefrom in the usual way (after removing the cap $i$) without the liability of imbibing impurities therefrom.

I believe I have described my invention so as to enable a person skilled to make the same.

I do not claim, broadly, a filter; but

What I claim, and desire to secure by Letters Patent, is—

A filter and stopper combined in the manner and for the purpose described.

In testimony whereof I have hereunto set my hand and seal this 11th day of September, 1861.

GEO. H. MELLEN. [L. S.]

Witnesses:
NELSON W. STEELE,
JEREMY W. BLISS.